(12) United States Patent
Wu et al.

(10) Patent No.: US 10,139,953 B2
(45) Date of Patent: Nov. 27, 2018

(54) METHOD, DEVICE AND SYSTEM OF TOUCH PANEL DISPLAY CONTROL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hao Wu, Beijing (CN); Hongjun Yu, Beijing (CN); Ziwei Cui, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/432,369

(22) Filed: Feb. 14, 2017

(65) Prior Publication Data

US 2017/0153756 A1 Jun. 1, 2017

Related U.S. Application Data

(63) Continuation of application No. 14/344,848, filed as application No. PCT/CN2013/089730 on Dec. 17, 2013.

(30) Foreign Application Priority Data

May 10, 2013 (CN) .......................... 2013 1 0173517

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04104* (2013.01); *G06F 2203/04105* (2013.01)

(58) Field of Classification Search
None
See application file for complete search history.

(56) References Cited

U.S. PATENT DOCUMENTS 9,342,198 B2 * 5/2016 Kang ..................... G06F 3/044
2006/0109391 A1 * 5/2006 Huitema ............. G09G 3/3611
349/19

(Continued)

FOREIGN PATENT DOCUMENTS

CN 1773442 A 5/2006
CN 1959796 A 5/2007

(Continued)

OTHER PUBLICATIONS

First Chinese Office Action dated Sep. 6, 2015; Appln. No. 201310173517.6.

(Continued)

*Primary Examiner* — Dorothy Harris
(74) *Attorney, Agent, or Firm* — Ladas & Parry LLP

(57) ABSTRACT

The embodiments of the present invention disclose a method, a device and a system of touch panel display control. The method of touch panel display control comprises: acquiring the changes of the capacitances at respective positions of coupling capacitors, and determining pressed pixel units; determining the pressure on the pressed pixel units according to a first corresponding relationship between the changes and the pressure; and according to a second corresponding relationship between the pressure and a current gray level and a compensation signal, outputting a compensation signal corresponding to the pressure on the (Continued)

pressed pixel units, and the compensation signal is used for keeping the consistency of the light transmittance of the pressed pixel units with that of non-pressed pixel units. The method of the present invention keeps a consistent light transmittance between the liquid crystal molecules of the pressed pixel units and the liquid crystal molecules of the non-pressed pixel units, so that the image display of the overall touch panel keeps consistent, and the quality of the image displayed by the touch panel is improved.

6 Claims, 2 Drawing Sheets

(56) References Cited

U.S. PATENT DOCUMENTS

| | | | |
|---|---|---|---|
| 2008/0048994 | A1 | 2/2008 | Lee et al. |
| 2008/0115052 | A1 | 5/2008 | Stevenson et al. |
| 2010/0123592 | A1* | 5/2010 | Nurmi .................. G06F 3/0414 340/665 |
| 2010/0220068 | A1* | 9/2010 | Chen .................... G02F 1/13338 345/173 |
| 2012/0013571 | A1 | 1/2012 | Yeh et al. |
| 2013/0181928 | A1* | 7/2013 | Li .......................... G06F 3/0414 345/173 |
| 2014/0071077 | A1* | 3/2014 | Kang ...................... G06F 3/044 345/173 |
| 2014/0168137 | A1* | 6/2014 | Pyo ....................... G06F 3/0412 345/174 |
| 2014/0247239 | A1* | 9/2014 | Jamshidi-Roudbari ...................... G06F 3/0414 345/174 |

FOREIGN PATENT DOCUMENTS

| | | | |
|---|---|---|---|
| CN | 101221735 A | * | 7/2008 |
| CN | 101859039 A | | 10/2010 |
| CN | 102830842 A | | 12/2012 |
| CN | 103309611 A | | 9/2013 |

OTHER PUBLICATIONS

Second Chinese Office Action dated Mar. 11, 2016; Appln. No. 201310173517.6.
International Preliminary Report on Patentability dated Nov. 10, 2015; PCT/CN2013/089730.
Written Opinion of the International Searching Authority dated Mar. 27, 2014; PCT/CN2013/089730.
International Search Report dated Mar. 27, 2014; PCT/CN2013/089730.
USPTO AA dated Jan. 27, 2017 in connection with U.S. Appl. No. 14/344,848.
USPTO AA dated Feb. 24, 2016 in connection with U.S. Appl. No. 14/344,848.
USPTO AA dated Jun. 13, 2016 in connection with U.S. Appl. No. 14/344,848.
USPTO FOA dated Apr. 5, 2016 in connection with U.S. Appl. No. 14/344,848.
USPTO FOA dated Nov. 15, 2016 in connection with U.S. Appl. No. 14/344,848.
USPTO FOA dated Dec. 16, 2015 in connection with U.S. Appl. No. 14/344,848.
USPTO NFOA dated Jul. 28, 2016 in connection with U.S. Appl. No. 14/344,848.
USPTO NFOA dated Sep. 3, 2015 in connection with U.S. Appl. No. 14/344,848.

* cited by examiner

METHOD, DEVICE AND SYSTEM OF TOUCH PANEL DISPLAY CONTROL

TECHNICAL FIELD

The embodiments of the present invention relate to a method, a device and a system of touch panel display control.

BACKGROUND

With the fast development of display technology, touch panels have been popularized in people's daily life. Currently, touch panels can be divided into resistive touch panels, capacitive touch panels, an infrared touch panels and a surface sound wave type touch panels according to working principles. Wherein, the capacitive touch panel has been widely used industrially as it can achieve true multi-point touch and high sensitivity. When the capacitive touch panel is pressed, the capacitance of a coupling capacitor provided in the touch panel changes, so that the chip of a display device can determine the pressed position.

Current capacitive touch panels are liquid crystal display screens comprising a color filter substrate and an array substrate which are assembled, and a liquid crystal layer provided between the color filter substrate and the array substrate. When the liquid crystal screen displays an image, the liquid crystal molecules of the liquid crystal layer are twisted so that light is irradiated to the color filter substrate through the liquid crystal molecules, and then the image is displayed.

The defects of the prior art lie in that, when the touch panel is pressed, the thickness of the liquid crystal layer is changed due to the pressure, so that the pressed part and the non-pressed part of the liquid crystal layer have different light transmittances, and then the effect of the displayed image is lowered and then the quality of the image display of the overall touch panel is affected.

SUMMARY

The embodiments of the present invention provide a method, a device and a system of touch panel display control, to improve the quality of the image display of touch panels.

The method of touch panel display control provided by the embodiment of the present invention comprises: acquiring the amount of changes of the capacitances at respective positions of coupling capacitors, and determining pressed pixel units;

determining the pressure on the pressed pixel units according to a first corresponding relationship between the amount of changes of the capacitances at the positions of the coupling capacitor and the pressure; and according to a second corresponding relationship between the pressure on the pressed pixel units and a current gray level as well as a compensation signal, outputting a compensation signal corresponding to the pressure on the pressed pixel units, and the compensation signal is used for keeping the consistency of the light transmittance of the pressed pixel units with that of non-pressed pixel units.

Preferably, the first corresponding relationship is the corresponding relationship, obtained through a plurality of experiments, between the amount of changes of the capacitances of coupling capacitors and the pressure on the pressed pixel units.

Preferably, the second corresponding relationship is the relationship between different pressures and the compensation signal, which is obtained through searching a compensation signal lookup table corresponding to pressure information according to the current gray level and the pressure information.

The device of touch panel display control provided by the embodiment of the present invention comprises:

an acquiring unit configured to acquire the amount of changes of the capacitances at respective positions of coupling capacitors and determining pressed pixel units; and a controlling unit configured to determine the pressure on the pressed pixel units according to a first corresponding relationship between the amount of changes of the capacitances at the positions of the coupling capacitors and the pressure; and output a compensation signal corresponding to the pressure on the pressed pixel units according to a second corresponding relationship between the pressure on the pressed pixel units and a current gray level and a compensation signal, and the compensation signal is used for keeping the consistency of the light transmittance of the pressed pixel units with that of non-pressed pixel units.

The system of touch panel display control provided by the embodiment of the present invention comprises:

a liquid crystal panel comprising a plurality of pixel units;

coupling capacitors provided on the liquid crystal panel for acquiring the amount of changes of the capacitances at the positions of the coupling capacitors on the liquid crystal panel and determining the pressed pixel units; and a compensation chip provided on the liquid crystal panel and in signal connection with the coupling capacitors, which is used for determining the pressure on the pressed pixel units according to a first corresponding relationship between the amounts of changes of the capacitances at the positions of the coupling capacitors and the pressure; and outputting a compensation signal corresponding to the pressure on the pressed pixel units according to a second corresponding relationship between the pressure on the pressed pixel units and a current gray level as well as a compensation signal, and the compensation signal is used for keeping the consistency of the light transmittance of the pressed pixel units with that of non-pressed pixel units.

Preferably, the compensation chip comprises:

a storage which stores the first corresponding relationship between the amounts of changes of the capacitances at the positions of coupling capacitors and the pressure, and the second corresponding relationship between the pressure on the pressed pixel units and the current gray level as well as the compensation signal; and a processor in signal connection with the storage, which is configured for determining the pressure on the pressed pixel units according to the first corresponding relationship between the amount of changes of the capacitances at the positions of the coupling capacitors and the pressure; and outputting a compensation signal corresponding to the pressure on the pressed pixel units according to the second corresponding relationship between the pressure on the pressed pixel units and a current gray level as well as a compensation signal, and the compensation signal is used for keeping the consistency of the light transmittance of the pressed pixel units with that of non-pressed pixel units.

The method provided by the embodiment of the present invention first acquires the change information of the capacitances of the coupling capacitors; then determines the pressure information of the pressed pixel units according to the change information of the capacitances of the current coupling capacitors and the first preset corresponding relationship between the change information of different capacitances and the pressure information corresponding to the respective pressed pixel unit; and outputting a compensation signal corresponding to the pressed pixel units according to the pressure information and the second preset corresponding relationship between the different pressure information and the compensation signal corresponding to the pixel units. The method provided by the present invention can keep a consistent light transmittance between the liquid crystal molecules of the pressed pixel units and the liquid crystal molecules of the non-pressed pixel units through providing the compensation signal to the pressed pixel units, and then keep the consistency of the displayed image of the overall touch panel and improve the quality of the image displayed by the touch panel.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

REFERENCE SIGNS

10—liquid crystal panel; 20—coupling capacitor; 30—compensation chip; 31—storage; 32—processor; 40—acquiring unit; 50—controlling unit

DETAILED DESCRIPTION

In order to improve the quality of the image display of touch panels, the embodiments of the present invention provide a method, a device and a system of touch panel display control. In the present technical solution, consistent light transmittance between the liquid crystal molecules of the pressed pixel units and the liquid crystal molecules of the non-pressed pixel units can be kept through providing the compensation signal to the pressed pixel units, and then the consistency of the displayed image of the overall touch panel can be kept and the quality of the image displayed by the touch panel can be improved. In order to make objects, technical details and advantages of the embodiments of the invention apparent, the technical solutions of the embodiment will be described in a clearly and fully understandable way in connection with the drawings related to the embodiments of the invention.

Figure 1:
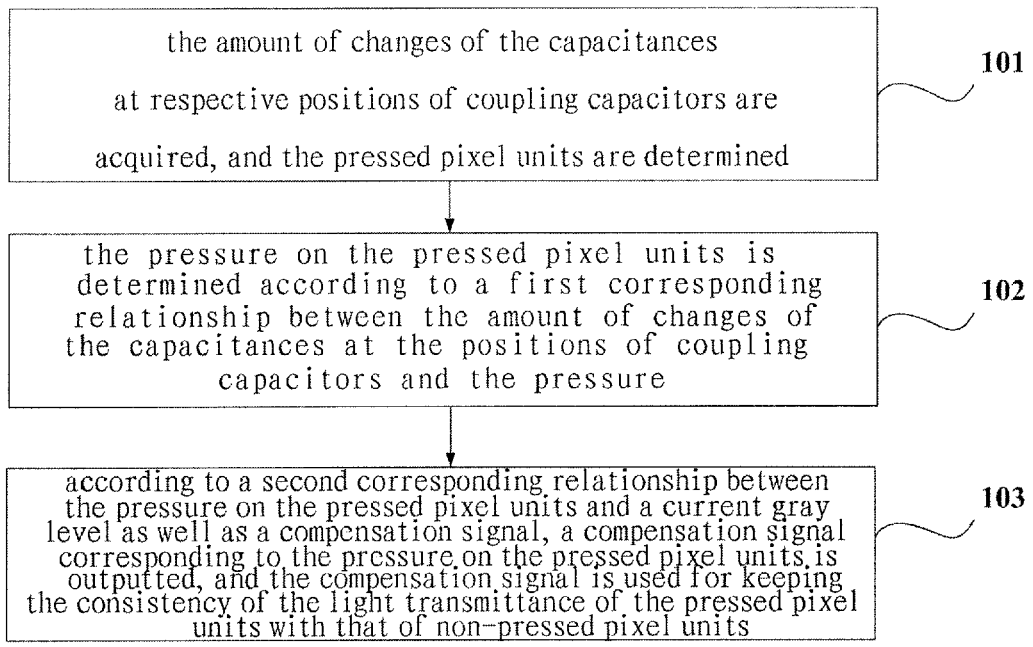
FIG. 1 is a flow chart of the method of touch panel display control in the embodiment of the present invention.

As shown in FIG. 1, it is a flow chart of the method of touch panel display control in the embodiments of the present invention.

At step 101, the amount of changes of the capacitances at respective positions of coupling capacitors are acquired, and the pressed pixel units are determined;

At step 102, the pressure on the pressed pixel units is determined according to a first corresponding relationship between the amount of changes of the capacitances at the positions of coupling capacitors and the pressure; and At step 103, according to a second corresponding relationship between the pressure on the pressed pixel units and a current gray level as well as a compensation signal, a compensation signal corresponding to the pressure on the pressed pixel units is outputted, and the compensation signal is used for keeping the consistency of the light transmittance of the pressed pixel units with that of non-pressed pixel units.

The method of touch panel display control provided by the embodiments of the present invention first acquires the amount of changes of the capacitances at the positions of the coupling capacitor and then determines the pressed pixel units; then, determines the pressure on the pressed pixel units according to the first corresponding relationship between the amount of changes of the capacitances at the positions the coupling capacitors and the pressure; and outputs a compensation signal corresponding to the pressure on the pressed pixel units according to the second corresponding relationship between the pressure on the pressed pixels and the current gray level as well as the compensation signal, and the compensation signal is used to keep the consistency of the light transmittance of the pressed pixel units with that of the non-pressed pixel units, and then the consistency of the displayed image of the overall touch panel is maintained and the quality of the image displayed by the touch panel is improved.

Specifically, the pressed pixel units are determined through acquiring the amount of changes of the capacitances at the positions of the coupling capacitors, and the pressure information of the pressed pixel units is determined by the first corresponding relationship obtained through a plurality of experiments, between the amounts of changes of the capacitances of the coupling capacitors and the pressure on the pressed pixel units; then, according to the pressure on the pressed pixel units and the current gray level, the compensation signal lookup table corresponding to the pressure is searched to obtain the corresponding compensation signal, and the searched compensation signal is outputted to the pressed pixel units, so that the pressed pixel units keep consistency with the non-pressed pixel units in light transmittance, and the display quality of the image of the touch panel is improved.

The first corresponding relationship is the relationship between the amount of changes of the capacitances of coupling capacitors and the pressure on the pressed pixel units, which is obtained through a plurality of experiments. When the pixel units are pressed, the capacitances of the coupling capacitors change with the pressure, and different pressing forces correspond to different changes of the capacitances of the coupling capacitors. Therefore, the relationship between the pressing force and the amount of changes of the capacitances can be obtained through experiments, and a corresponding relationship table is established. During use, the pressure on the pixel units can be determined through searching the table.

The second corresponding relationship is different compensation signal lookup tables established according to experiments. As shown in table 1, LX gray level is taken as an example, the transmittance is Tx-0 in the case of no pressing, and when the pixel units are pressed by a force of N1, the light transmittances of the gray levels are measured with an optical measuring instrument, at this moment, LX changes to Tx-1, and the change amount of the transmittance is recorded as $\Delta Tx1=(Tx-1)-(Tx-0)$; when the pixel units are pressed by a force of N2, the light transmittances of the gray levels are measured with the optical measuring instrument, at this moment, the change amount of the gray level LX is ΔTX2, in this way, after the measuring, a matrix corresponding relationship table between the pressure and the changes of the transmittance is established.

TABLE 1 lookup table of transmittance

|    | L0    | L1    | L2    | LX    | ...  | L192   | L255   |
|----|-------|-------|-------|-------|------|--------|--------|
| N0 | T0-0  | T1-0  | T2-0  | Tx-0  | xx   | T192-0 | T255-0 |
| N1 | xx    | xx    | xx    | ΔTx1  | xx   | xx     | xx     |
| N2 | xx    | xx    | xx    | ΔTx2  | xx   | ΔTxX   | xx     |
| ...| xx    | xx    | xx    | xx    | xx   | xx     | xx     |
| NX | xx    | xx    | xx    | ΔTxX  | xx   | xx     | xx     |

In table 1, the first row represents the current gray levels, and the first column represents the pressing forces.

As shown in table 2, the target gray level corresponding to the current gray level is measured through the optical measuring instrument when the transmittance changes. For example, when the transmittance changes to ΔTxX, the target gray level corresponding to the current gray level L192 is L255, and the respective gray levels are sequentially measured at different changes of the transmittance to obtain the corresponding target gray levels.

TABLE 2 target gray level lookup table

|      | L0  | L1  | L2  | LX  | ... | L192 | L255 |
|------|-----|-----|-----|-----|-----|------|------|
| L0   | 0   | xx  | xx  | xx  | xx  | xx   | xx   |
| L2   | xx  | 0   | xx  | xx  | xx  | xx   | xx   |
| Lx   | xx  | xx  | xx  | xx  | xx  | xx   | xx   |
| ...  | xx  | xx  | xx  | xx  | xx  | xx   | xx   |
| L255 | xx  | xx  | xx  | xx  | xx  | ΔTxX | 0    |

In table 2, the first row represents the current gray levels, and the first column represents the target gray levels.

As shown in table 3, the target gray levels in table 2 are correspondingly filled into table 1 to obtain the target gray levels corresponding to the current gray levels under different pressing forces and then obtain the compensation lookup table. During use, after obtaining the pressing force, the signals to be compensated can be obtained through directly searching the compensation signal lookup table.

TABLE 3 compensation signal lookup table

|    | L0  | L1  | L2  | LX  | ... | L192 | L255 |
|----|-----|-----|-----|-----|-----|------|------|
| N0 | xx  | xx  | xx  | xx  | xx  | xx   | xx   |
| N1 | xx  | xx  | xx  | xx  | xx  | xx   | xx   |
| N2 | xx  | xx  | xx  | xx  | xx  | L255 | xx   |
| ...| xx  | xx  | xx  | xx  | xx  | xx   | xx   |
| NX | xx  | xx  | xx  | xx  | xx  | xx   | xx   |

In table 3, the first row represents the current gray levels, and the first column represents the pressing forces.

Figure 2:
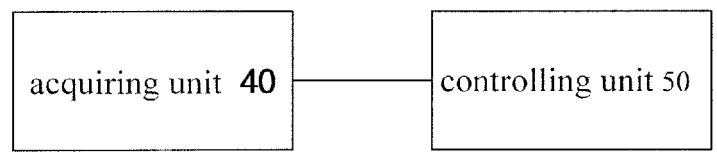
FIG. 2 is a schematic diagram of the structure of the device of touch panel display control in the embodiment of the present invention.

As shown in FIG. 2, FIG. 2 is a schematic diagram of the structure of the device of touch panel display control in the embodiments of the present invention. The embodiments of the present invention further provide a device of touch panel display control, comprising: an acquiring unit 40 for acquiring the amount of changes of the capacitances at respective positions of coupling capacitors and determining pressed pixel units; and a controlling unit 50 for determining the pressure on the pressed pixel units according to the first corresponding relationship between the amount of changes of the capacitances at the positions of the coupling capacitors and the pressure; and outputting a compensation signal corresponding to the pressure on the pressed pixel units according to the second corresponding relationship between the pressure on the pressed pixel units and a current gray level as well as a compensation signal, and the compensation signal is used for keeping the consistency of the light transmittance of the pressed pixel units with that of non-pressed pixel units.

The device provided by this embodiment can keep a consistent light transmittance between the liquid crystal molecules of the pressed pixel units and the liquid crystal molecules of the non-pressed pixel units, and then improve the quality of the image displayed by a liquid crystal display device.

Figure 3:
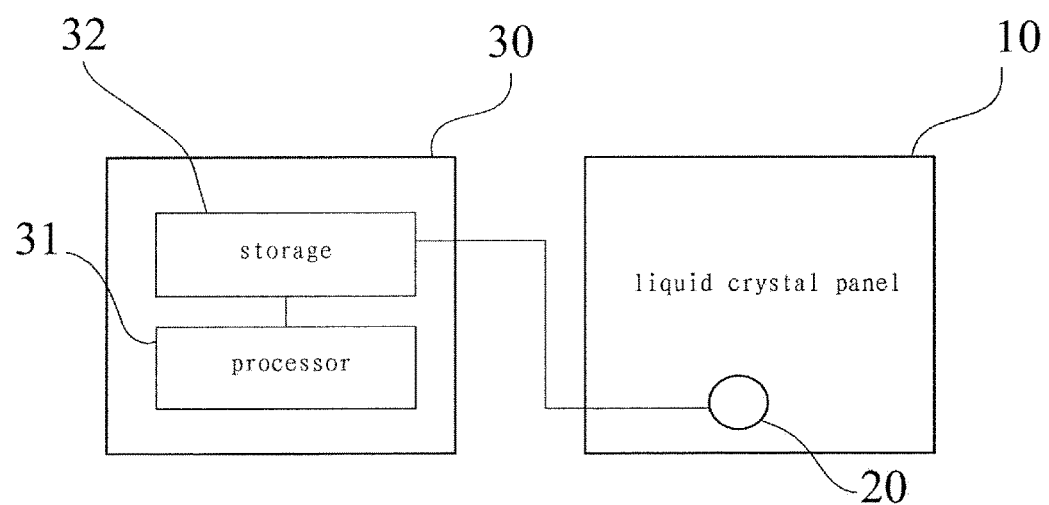
FIG. 3 is a schematic diagram of the structure of the system of touch panel display control in the embodiment of the present invention.

As shown in FIG. 3, it is a schematic diagram of the structure of the system of touch panel display control in the embodiments of the present invention. The system of touch panel display control provided by the embodiment of the present invention comprises: a liquid crystal panel 10 comprising a plurality of pixel units; coupling capacitors 20 provided on the liquid crystal panel 10 for acquiring the amount of changes of the capacitances at the positions of coupling capacitors on the liquid crystal panel 10 and determining the pressed pixel units; and a compensation chip 30 provided on the liquid crystal panel 10 and in signal connection with the coupling capacitors 20, which is used for determining the pressure on the pressed pixel units according to the first corresponding relationship between the amount of changes of the capacitances at the positions of the coupling capacitor and the pressure; and outputting a compensation signal corresponding to the pressure on the pressed pixel units according to the second corresponding relationship between the pressure on the pressed pixel units and a current gray level as well as a compensation signal, and the compensation signal is used for keeping the consistency of the light transmittance of the pressed pixel units with that of non-pressed pixel units.

Specifically, the coupling capacitors 20 are provided within the liquid crystal panel 10, when the liquid crystal panel 10 is pressed, the capacitances of the coupling capacitors 20 change, and the force on the liquid crystal panel 10 can be obtained through the changes of the capacitances.

The compensation chip 30 comprises a storage 31 and a processor 32.

The storage 31 stores the first corresponding relationship between the amount of changes of the capacitances at the positions of the coupling capacitors and the pressure, and the second corresponding relationship between the pressure on the pressed pixel units and the current gray level as well as the compensation signal.

The processor 32 is in signal connection with the storage, and used for determining the pressure on the pressed pixel units according to the first corresponding relationship between the amount of changes of the capacitances at the positions of the coupling capacitor and the pressure; and outputting a compensation signal corresponding to the pressure on the pressed pixel units according to the second corresponding relationship between the pressure on the pressed pixel units and a current gray level as well as a compensation signal, and the compensation signal is used for keeping the consistency of the light transmittance of the pressed pixel units with that of non-pressed pixel units.

To sum up, in the embodiments of the present invention, the pressure information of the pressed pixel units is obtained through acquiring the capacitance changes of the coupling capacitors under the pressure according to the information of the capacitance changes of the coupling capacitors and the first corresponding relationship; then the compensation signal corresponding to the pressed pixel units is outputted according to the pressure information and the second preset corresponding relationship, so that the liquid crystal molecules of the pressed pixel units keep consistent with the liquid crystal molecules of the non-pressed pixel units in light transmittance, and the quality of the image displayed by the touch panel is thereby improved.

The embodiments of the invention are thus described, and it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of touch panel display control, comprising: acquiring the amount of changes of the capacitances at respective positions of coupling capacitors, and determining pressed pixel units;
   determining a pressure on the pressed pixel units according to a first corresponding relationship between the amount of changes of the capacitances at the positions of the coupling capacitors and the pressure; and
   outputting a compensation signal corresponding to the pressure on the pressed pixel units while the pressure is maintained according to a second corresponding relationship, wherein the second corresponding relationship is a relationship in which a compensation signal is determined to obtain a target gray level by a combination of the pressure on the pressed pixel units and a current gray level, and wherein a value of the compensation signal changes as a value of the pressure on the pressed pixel units changes, and the compensation signal being used for keeping the consistency of the light transmittance of the pressed pixel units with that of non-pressed pixel units;
   wherein the second corresponding relationship is established by establishing a corresponding relationship between the pressure and change of the light transmittance, establishing a corresponding relationship between the current gray level and the target gray level based on the change of the light transmittance, and establishing a corresponding relationship between the current gray level and pressing force on the pressed pixel units.

2. The method of touch panel display control according to claim 1, wherein, the first corresponding relationship is the corresponding relationship, obtained through a plurality of experiments, between the amount of changes of the capacitances of coupling capacitors and the pressure on the pressed pixel units.

3. The method of touch panel display control according to claim 1, wherein, the second corresponding relationship is the relationship between different pressures and the compensation signals, which is obtained through searching a compensation signal lookup table corresponding to pressure information according to the current gray level and the pressure information.

4. A device of touch panel display control, comprising: an acquiring unit configured for acquiring the amount of changes of the capacitances at respective positions of coupling capacitor and determining pressed pixel units; and
   a controlling unit configured for determining the pressure on pressed pixel units according to a first corresponding relationship between the amount of changes of the capacitances at the positions of the coupling capacitor and the pressure; and
   outputting a compensation signal corresponding to the pressure on the pressed pixel units while the pressure is maintained according to a second corresponding relationship, the second corresponding relationship is a relationship in which a compensation signal is determined to obtain a target gray level by a combination of the pressure on the pressed pixel units and a current gray level, and wherein a value of the compensation signal changes as a value of the pressure on the pressed pixel units changes, and the compensation signal being used for keeping the consistency of the light transmittance of the pressed pixel units with that of non-pressed pixel units;
   wherein the second corresponding relationship is established by establishing a corresponding relationship between the pressure and change of the light transmittance, establishing a corresponding relationship between the current gray level and the target gray level based on the change of the light transmittance, and establishing a corresponding relationship between the current gray level and pressing force on the pressed pixel units.

5. A system of touch panel display control, comprising: a liquid crystal panel comprising a plurality of pixel units;
   coupling capacitors provided on the liquid crystal panel and configured for acquiring the amount of changes of the capacitances at positions of the coupling capacitor and determining pressed pixel units; and
   a compensation chip provided on the liquid crystal panel and in signal connection with the coupling capacitors, which is configured for determining the pressure on the pressed pixel units according to a first corresponding relationship between the amount of changes of the capacitances at the positions of the coupling capacitors and the pressure; and
   outputting a compensation signal corresponding to the pressure on the pressed pixel units while the pressure is maintained according to a second corresponding relationship, the second corresponding relationship is a relationship in which a compensation signal is determined to obtain a target gray level by a combination of the pressure on the pressed pixel units and a current gray level, and wherein a value of the compensation signal changes as a value of the pressure on the pressed pixel units changes, and the compensation signal being used for keeping the consistency of the light transmittance of the pressed pixel units with that of non-pressed pixel units;
   wherein the second corresponding relationship is established by establishing a corresponding relationship between the pressure and change of the light transmittance, establishing a corresponding relationship between the current gray level and the target gray level based on the change of the light transmittance, and establishing a corresponding relationship between the current gray level and pressing force on the pressed pixel units.

6. The system of touch panel display control according to claim 5, wherein, the compensation chip comprises:
   a storage which stores the first corresponding relationship between the amount of changes of the capacitances at the positions of the coupling capacitors and the pressure, and a second corresponding relationship between the pressure on the pressed pixel units and the current gray level to obtain the target gray level; and a processor in signal connection with the storage, which is configured for determining the pressure on the pressed pixel units according to the first corresponding relationship between the amount of changes of the capacitances at the positions of the coupling capacitor and the pressure; and outputting the compensation signal corresponding to the pressure on the pressed pixel units according to the second corresponding relationship between the pressure on the pressed pixel units and the current gray level as well as the compensation signal, and the compensation signal being used for keeping the consistency of the light transmittance of the pressed pixel units with that of non-pressed pixel units.

* * * * *